Oct. 15, 1957  A. E. SPRANDO  2,810,084
MOTOR AND END BELL THEREFOR
Filed July 18, 1955
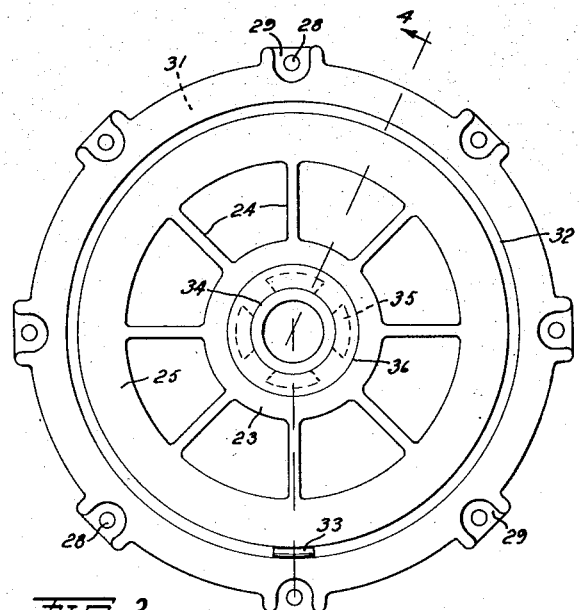
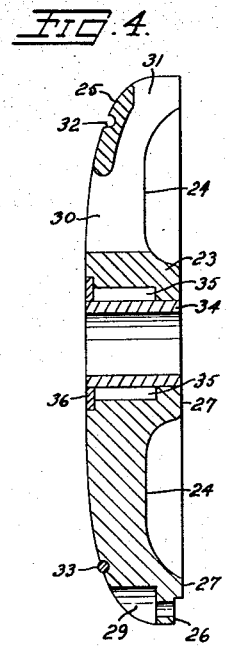
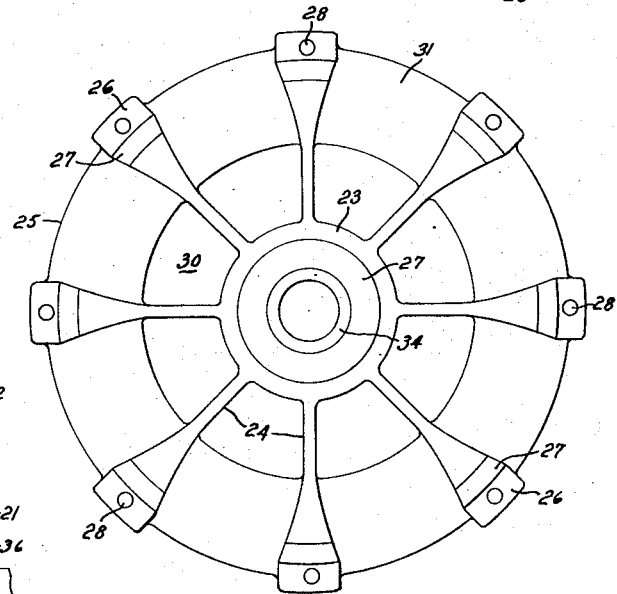
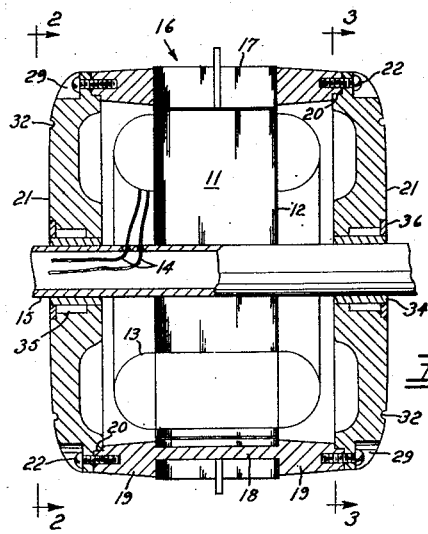
INVENTOR.
Anthony E. Sprando
BY
AGENT United States Patent Office 2,810,084
Patented Oct. 15, 1957

2,810,084

MOTOR AND END BELL THEREFOR

Anthony E. Sprando, Portland, Oreg., assignor to Iron Fireman Manufacturing Company, Portland, Oreg.

Application July 18, 1955, Serial No. 522,524

7 Claims. (Cl. 310—60)

This invention relates generally to electric motors and more particularly to electric motors of the induction type in which the secondary winding is carried on the rotor exterior of the stator.

Specifically, this invention provides an improved rotor end bell for the electric motor of my invention disclosed in my U. S. Patent application S. N. 468,637, filed November 15, 1954. The motor of my application S. N. 468,637 could be termed an "inside-out" motor since the wound stator is the inner member with a hollow shaft therethrough and the inductively energized rotor is the outer member with end bells having axially inserted bearings riding on the stationary shaft of the stator.

It is the general and principal object of this invention to take advantage of the rotating rotor supporting and enclosing nature of an end bell for such a motor to give to the end bell the additional functions that its nature makes possible.

It is a second object of my invention to provide an end bell for this type of motor which is not required to have any function in the electrical design of the motor.

It is a third object to provide an end bell for such a motor which can be made of a rigid insulating material or a rigid conducting material in accordance with the mechanical esthetic or economic requirements of the particular design.

It is a fourth object to provide for such a motor and end bell having means integral therewith for receiving and retaining balancing weights.

It is a fifth object to provide for such a motor an end bell having means integral therewith for circulating cooling air through the interior of the motor.

It is a sixth object to provide for such a motor an end bell including an axially disposed sleeve bearing and means formed in the end bell for receiving and gradually dispensing sufficient lubricant to last the guaranteed life of the motor.

How these and other objects are accomplished is explained in the following description referring to the attached drawing in which Fig. 1 is a fragmental longitudinal section through a motor of the type for which this end bell is adapted.

Fig. 2 is an outer view of the end bell viewed along the line 2—2 of Fig. 1.

Fig. 3 is an inner view of the end bell viewed along the line 3—3 of Fig. 1.

Fig. 4 is a transverse sectional view of the end bell viewed along the line 4—4 of Fig. 2.

Like reference numerals refer to like parts in the several figures of the drawing.

Referring now to the drawing at 11 is indicated a motor stator having a laminated iron core 12 with windings 13 and terminals 14 leading to the outside through hollow shaft 15 of stator 11.

Rotor 16 has laminated iron core 17 with secondary winding bars 18 and end rings 19 to which are fitted at rabbet joints 20 identical end bells 21 secured to end rings 19 by screws 22.

Figs. 2, 3 and 4 are more complete drawings of either of the end bells 21 which are the form of my invention here described.

Referring now to the end bell 21 shown in Figs. 2, 3 and 4, the end bell is seen to include a hub part 23, a plurality of equally spaced radial spokes 24 and an annular shroud 25. The spokes 24 may be formed integrally with the hub part 23 at their inner ends as shown and at their outer ends the spokes 24 may be formed integrally with the annular shroud 25 as shown.

Spokes 24 at their outer ends are widened circumferentially to provide the desired width to form bearing surfaces 26 set back from the inner surface 27 to form at 20 a rabbet joint with secondary winding ring 19.

On the axially outer side of end bell 21, at the radially outer ends of spokes 24, holes 28 are formed to receive screws 22, with the heads of screws 22 set up against the bottom surfaces of relief spaces 29 formed around holes 28 for that purpose.

Shroud 25 carried on spokes 24 is seen to be of greater inside diameter than hub 23 and spaced therefrom to form cooling air inlet passages 30 therebetween. Also shroud 25 is seen to be of lesser outside diameter than spokes 24 and to be axially spaced outwardly from mounting surfaces 26 to form heated air outlet passages 31 from the interior of the motor. Spokes 24 form the blades of a multiple blade, radial blade fan having multiple inlets 30 and multiple outlets 31 which simply and effectively cools the motor when in operation.

Annular groove 32 formed in the outer surface of shroud 25 is for the purpose of receiving one or more malleable metal balancing slugs 33 positioned circumferentially around one or both end bells 21 to dynamically balance the rotor 16.

Pressed into an axial hole formed through end bell 21, as shown, is a sintered or porous bronze cylindrical sleeve bearing 34. Formed parallel with bearing 34 and spaced thereabout are grease pockets 35 formed in hub 23 as indicated. These pockets are filled with a so-called perpetual grease as recommended by the several suppliers of this material under their individual brands. After filling with a suitable grease the pockets 35 are sealed with grease seal 36 pressed into a counterbore formed in the face of hub 23 as shown.

It is seen that my end bells 21 are of simple, low-cost design and include in each simple structure, means for closing and supporting rotor 16, rotor bearing means of the sleeve type provided with sealed perpetual greasing means, simple means for receiving and retaining at designated positions the slugs required for dynamic balancing of the rotor and a complete cooling air circulating means including inlet and outlet passages and a multiblade fan for circulating ambient air to the inside of the rotor around the stator and to the outside of the rotor again.

And it should be again noted that while in the type of outer rotor secondary motor structure shown the secondary winding becomes a current conducting frame member of the motor, my end bell 21 can be formed or molded of insulating material which will electrically isolate the rotor from any stationary structure. And again the molded insulating end bell can be made of material selected to dampen the conduction of noise creating vibrations from the rotor to the stator.

Having listed some of the objects of my invention of my end bell and my motor for which it is especially designed, illustrated and described a preferred form in which I have practiced my invention and explained the operation, I claim.

1. An induction type electric motor having an inner stator with a shaft and an outer rotor with bearings supporting said rotor to rotate on said shaft: said rotor including the secondary iron structure of said motor with the secondary winding structure cast thereon and a pair of end bells secured respectively to the opposite ends of said secondary winding structure; each of said end bells comprising an inner hub, an outer shroud radially spaced outwardly from said hub and a plurality of spokes; said spokes at their inner ends being secured to said hub; said spokes at their outer ends being secured to said secondary winding structure of said rotor and said spokes intermediate their ends being secured to said shroud; whereby as said rotor is rotated on said shaft said spokes will operate as fan blades to draw ambient cooling air through said end bell between said hub said shroud and said spokes to the interior of said rotor about said stator and to discharge said air through said rotor between said secondary winding said shroud and said spokes to the outside of said motor.

2. The motor of claim 1 in which each of said end bells is formed with an annular groove on the outer end surface thereof for the purpose of receiving and retaining one or more balancing slugs sized and positioned as required to place said rotor in dynamic balance while the motor is completely assembled.

3. The motor of claim 1 in which each of said end bells is formed of sound deadening material.

4. The motor of claim 1 in which each of said end bells is an integral die casting.

5. The motor of claim 1 in which each of said end bells is an integral molding of sound insulating plastic material.

6. An end bell for the rotor of an electric motor having an inner stator and an outer rotor, said end bell including fan means formed integrally therewith and said end bell being formed with air inlet and air outlet openings therethrough whereby when said motor is energized and said rotor is rotating said fan will induce air to the interior of said rotor through said inlet opening and eject air from the interior of said rotor through said outlet.

7. In an electric motor comprising a generally cylindrical stack of stator iron fixed to a stationary shaft, a generally tubular stack of rotor iron rotatably carried on said shaft coaxially with and closely radially spaced from said stator iron, said iron being formed with winding slots generally longitudinally thereof, said winding slots in said stator being approximately filled with coils of stator winding electrically conducting wire having end turns extending beyond said stator iron at each end thereof, said winding slots in said rotor iron being filled with a rotor winding bar structure extending from either end of said rotor iron to form with said rotor iron a rotor frame and a pair of end bells rotationally carried on said shaft and periferally secured respectively to the ends of said rotor frame, the improvement which includes providing separate positive air cooling mechanisms respectively for the end turns at each end of said stator winding, each of said cooling mechanisms including outwardly directed air outlet ports formed through the periphery of one of said end bells, a multiblade fan formed on the interior of said one of said end bells radially inwardly from said outlet ports and a row of air inlet ports formed longitudinally through said one of said end bells radially inwardly from said fan whereby as the air within said rotor and around the end turns of said stator winding near said one of said end bells is thrown outwardly through said air outlet ports the reduced pressure within the said one of said end bells will induce air into said rotor at high velocity to strike said end turns of said stator winding to cool said end turns before said induced air is picked up by said fan and expelled from said rotor through said air outlet ports.

References Cited in the file of this patent
UNITED STATES PATENTS

| | | |
|---|---|---|
| 550,042 | Diehl | Nov. 19, 1895 |
| 982,830 | Kingsbury | Jan. 31, 1911 |
| 1,500,401 | Lauer-Schmaltz | July 8, 1924 |
| 1,725,740 | Schulte | Aug. 20, 1929 |
| 1,822,859 | Perkins | Sept. 8, 1931 |
| 2,041,442 | Stinsman | May 19, 1936 |
| 2,281,858 | Pierce | May 5, 1942 |
| 2,709,228 | Miller et al. | May 24, 1955 |
| 2,785,424 | McMaster et al. | Mar. 19, 1957 |

FOREIGN PATENTS

| | | |
|---|---|---|
| 619,587 | Great Britain | Mar. 11, 1949 |
| 648,665 | Great Britain | Jan. 10, 1951 |
| 740,375 | Germany | Oct. 19, 1943 |
| 973,951 | France | Sept. 20, 1950 |